(12) United States Patent
Gold

(10) Patent No.: US 6,937,652 B2
(45) Date of Patent: Aug. 30, 2005

(54) FRAME COMPRESSION USING RADIX APPROXIMATION

(75) Inventor: Kevin C. Gold, Palo Alto, CA (US)

(73) Assignee: Seiko Epson Corporation, Tokyo (JP)

( * ) Notice: Subject to any disclaimer, the term of this patent is extended or adjusted under 35 U.S.C. 154(b) by 671 days.

(21) Appl. No.: 10/126,074

(22) Filed: Apr. 19, 2002

(65) Prior Publication Data

US 2003/0198291 A1 Oct. 23, 2003

(51) Int. Cl.$^7$ .............................................. H04N 7/12
(52) U.S. Cl. ................................................. 375/240.01
(58) Field of Search ........................ 348/386.1, 393.1, 348/654, 514, 530; 375/240.01, 240.02, 240.08

(56) References Cited

U.S. PATENT DOCUMENTS

| | | | |
|---|---|---|---|
| 5,426,468 A | * | 6/1995 | Jenison ........................ 348/654 |
| 5,546,390 A | | 8/1996 | Stone |
| 5,777,677 A | | 7/1998 | Linzer et al. |
| 5,873,078 A | | 2/1999 | Angle et al. |
| 5,875,249 A | * | 2/1999 | Mintzer et al. ............... 380/54 |
| 5,933,195 A | | 8/1999 | Florencio |
| 6,002,438 A | | 12/1999 | Hocevar et al. |
| 6,028,635 A | | 2/2000 | Owen et al. |
| 6,233,277 B1 | | 5/2001 | Ozcelik et al. |
| 6,236,760 B1 | | 5/2001 | Bagni et al. |
| 6,240,210 B1 | | 5/2001 | Koyama |
| 6,243,421 B1 | | 6/2001 | Nakajima et al. |
| 6,256,348 B1 | | 7/2001 | Laczko et al. |
| 6,272,253 B1 | | 8/2001 | Bannon et al. |

FOREIGN PATENT DOCUMENTS

WO   WO 01/27754   4/2001

* cited by examiner

Primary Examiner—Chris Kelley
Assistant Examiner—Behrooz Senfi

(57) ABSTRACT

Digital video data streams that conform to standards such as the ITU-T H.263 and MPEG-4 ISO/IEC standards are compressed to reduce the amount of memory needed to store these streams. Information for a sequence of frames is compressed by rounding and truncating luminance values, and by encoding chrominance values using a radix tree and a palette. Each entry in the palette stores information representing a color that actually occurs at least once in the sequence of frames. The radix tree provides an efficient way to generate compressed representations for colors that are stored in the palette, and also provides a way to identify the color in the palette that is the closest match to other colors in the data stream that are not stored in the palette.

28 Claims, 4 Drawing Sheets

FRAME COMPRESSION USING RADIX APPROXIMATION

CROSS-REFERENCE TO RELATED APPLICATIONS

This application is related to U.S. patent application entitled "Frame Compression Using Differential Codes and an Escape Code" by Kevin C. Gold, filed concurrently herewith and assigned to the assignee of this application.

TECHNICAL FIELD

The present invention is related generally to video signal processing, and is related more specifically to reducing the amount of memory needed to process encoded digital video data streams that conform to ITU-T H.263 and MPEG-4 ISO/IEC standards.

BACKGROUND ART

Memory is expensive, and most of the memory that is required to process encoded digital video data streams is used to store luminance and chrominance values for each pixel in a frame of data. Information for a frame must be stored in memory while that frame is decoded and processed. Although reducing memory requirements is attractive for any application, it is especially important for applications in hand-held and low-power devices like mobile telephones and so called personal digital assistants (PDAs) because limited circuit board space and power severely restrict memory chip size and power requirements.

Many applications conform to one of two coding standards that reduce memory requirements by using data compression techniques. The H.263 standard, published by the International Telecommunications Union (ITU), supports video compression for video-conferencing and video-telephony applications. The MPEG-4 standard, known officially as ISO/IEC 14496, is published by the International Organization for Standardization (ISO) and facilitates the integration of digital television, interactive graphics and interactive multimedia. These techniques can reduce the memory required by processes that transmit or store the information, but they do not address the amount of memory required by processes that decode the encoded information.

Attempts to provide additional compression encounter several problems. One problem is caused by many compression schemes that introduce small errors into the digital video data and the magnitude of these errors accumulates during decoding. Small inaccuracies caused by rounding or truncation, for example, are amplified in predictive filters used by the decoding process because the errors in each stage cause larger errors in a later stage of prediction.

Another problem is caused by the fact individual pixels throughout an image must be accessed quickly for processes like motion compensation. This requirement makes compression techniques that rely on variable-length symbols unattractive because random accesses into memory are more difficult.

DISCLOSURE OF INVENTION

It is an object of the present invention to provide a technique for reducing the amount of memory required to store and process frames of encoded digital video data.

According to one aspect of the present invention, compression of digital video data representing luminance values, first chrominance values and second chrominance values for a plurality of pixels, is carried out for a respective pixel by storing in memory a compressed representation of the luminance value for the respective pixel; generating a lookup key in response to the first chrominance value and the second chrominance value for the respective pixel; determining whether an entry in a data structure has a key that matches the lookup key, wherein the data structure comprises a plurality of entries each having a respective key, a respective identifier, and a respective pair of first and second chrominance values; when an entry in the data structure has a key that matches the lookup key, storing in memory the identifier of the entry in the data structure having the key that matches the lookup key; and when no entry in the data structure has a key that matches the lookup key, either: storing in memory the identifier of the entry in the data structure having a key that approximately matches the lookup key when the method is operating in an approximate mode of operation, or adding an entry to the data structure having a key that matches the lookup key, having a unique identifier, and having a pair of first and second chrominance values derived from the first chrominance value and the second chrominance value for the respective pixel, storing in memory the unique identifier of the entry added to the data structure, and setting the approximate mode of operation when no further entries are to be added to the data structure.

The various features of the present invention and its preferred implementations may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

Overview

Figure 1:
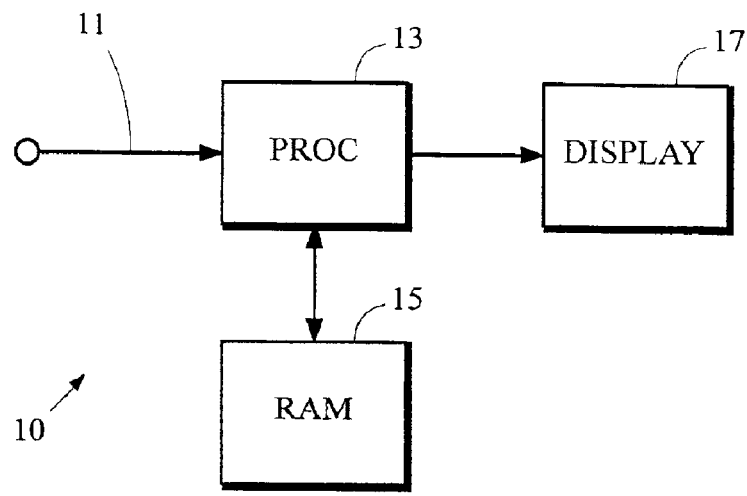
FIGS. 1 to 2 are schematic block diagrams of devices that receive and process digital video data streams.

FIG. 1 is a schematic block diagram of a device 10 such as a mobile telephone or a personal digital assistant (PDA) that receives and processes a digital video data stream and incorporates various aspects of the present invention. The digital video data stream is received from a path 11, which may be a wired or wireless communication paths with another device that provides the data stream. The processor 13 processes the data stream arranged in frames of information, stores the frames of information into random access memory (RAM) 15, and subsequently retrieves the stored information from the RAM 15, processes the frames of information to prepare them for use in an application, and passes the processed information to the application. In the example shown, the application is the display component 17, which may be implemented by a liquid crystal display (LCD) or thin-film transistor (TFT) panel, for example. Other examples of applications include video recorders, video editors, and video broadcast transmitters.

Figure 2:
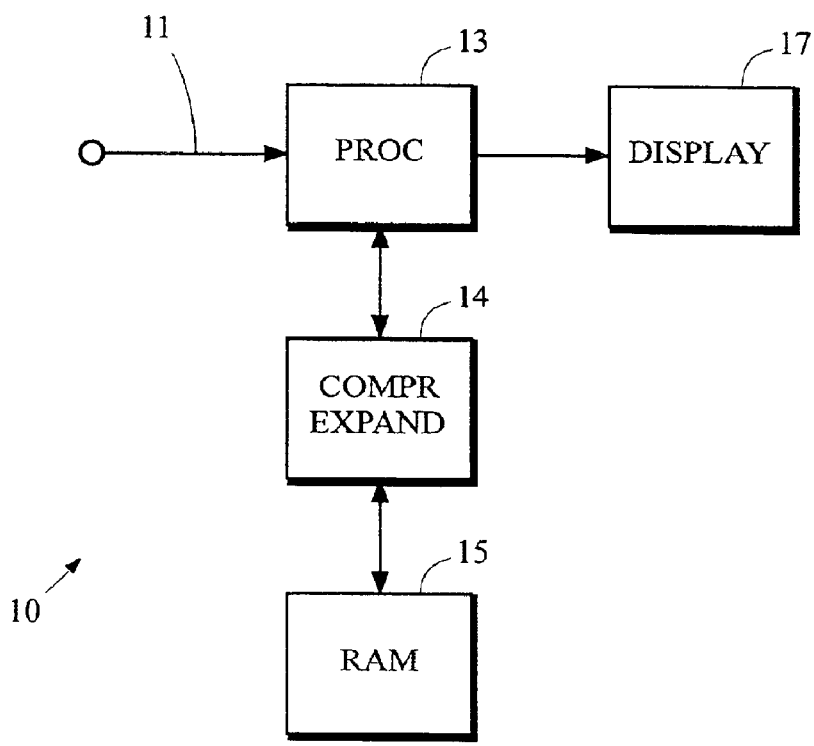

The present invention is directed toward data compression of the digital video information stored in the RAM 15 so that the amount of RAM required to store the information can be reduced. In the implementation shown in FIG. 1, the present invention is implemented by functions performed by the processor 13. In another implementation shown in FIG. 2, the present invention is implemented by a data compressor/expander 14 interposed between the processor 13 and the RAM 15. This implementation can incorporate aspects of the present invention with existing processing devices without requiring any changes to the functions performed by the processor 13. This implementation is capable of letting the processor 13 operate as if it stored and retrieved digital video information directly with the RAM 15. The data compressor/expander 14 intercepts memory access requests by the processor 13 to store and retrieve digital video information in the RAM 15, and it services those requests using an amount of RAM that is smaller than otherwise would be possible.

The schematic block diagrams shown in these figures omit components that may be important to practical implementations but are not required to explain the present invention. For example, the diagrams omit features that pertain to power, power management, and input/output interfaces.

Components in the device 10, as well as in any other device that incorporates aspects of the present invention, may be implemented in any suitable manner including discrete and integrated electronic components, programmed logic, gate arrays, general purpose program-controlled processors, digital signal processors, and application-specific integrated circuits. For implementations that use program-controlled processors, the controlling program of instructions may be conveyed by essentially any device-readable media including magnetic and optical storage media, and solid-state memory devices. The manner of implementation is not critical in principle to the present invention.

The following discussion refers to implementations of the present invention that may be used to compress information representing picture elements ("pixels") in digital video data streams that conform to ITU-T H.263 and MPEG-4 ISO/IEC standards, and to recover decompressed video information from the compressed representations. It should be understood, however, that the present invention may be applied to data streams that conform to other standards. The methods discussed below may be performed by the processor 13 in implementations of the device 10 like that shown in FIG. 1, performed by the data compression/expansion processor 14 in implementations like that shown in FIG. 2, or performed by essentially any other arrangement of processing circuitry that may be desired.

Data Compression

Figure 3:
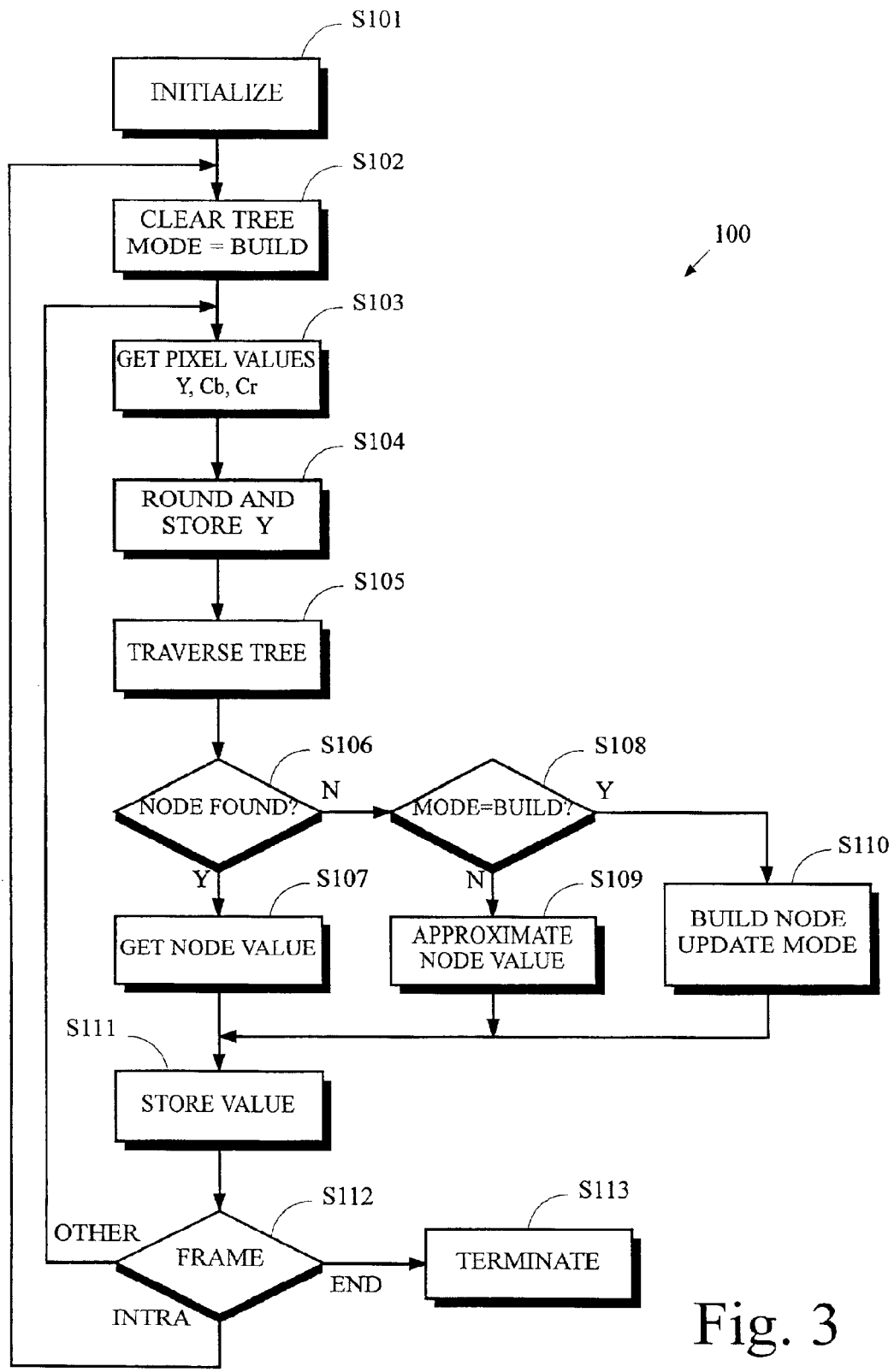
FIG. 3 is a flow diagram illustrating steps in a method that may be used to perform data compression of digital video information.

FIG. 3 illustrates steps in a method 100 that compresses information for pixels in a sequence of frames of digital video information in a data stream. Step S101 initializes program and hardware components. Information stored in memory that represents a radix tree, described in more detail below, is cleared and a variable Mode is set to indicate a new tree is to be built from information obtained in step S102 from the digital video information.

Step S103 extracts data from the digital video information to obtain the luminance value Y and the chrominance values Cb, Cr for a pixel. Preferably, the luminance value Y is rounded and truncated in step S104, and the truncated value is stored in the RAM 15. The rounding and truncation operations should not have any bias, otherwise the luminance that is obtained by a complementary data-expansion process using predictive methods will quickly fade to white or to black, depending on the direction of the bias. Luminance values that are equidistant from either of two valid truncated values should be rounded to the even truncated value. If predictive methods are not used in the expansion process, the bias introduced by mere truncation is not as significant.

Step S105 traverses the radix tree using a lookup key K derived from the pair of chrominance values Cb, Cr and step S106 determines whether a node having this key is found in the tree. If such a node is found, a code value X for this node is obtained from the tree and subsequently used to represent the chrominance information in a compressed form.

If a node having the key value K is not found, step S108 determines whether the variable Mode indicates the radix tree is being built. If it is being built, step S110 creates a new node in the tree, obtains its code value X, and updates the Mode variable as necessary to indicate the building of the radix tree has been completed. If step S108 determines the variable Mode indicates the building of the tree has been completed, step S109 obtains the code value X for a node having a key value that approximates the value K that was not found in the tree.

Step S111 stores the code value X in the RAM 15 to represent the pair of chrominance values Cb, Cr in a compressed form.

Step S112 determines whether all digital video information for the current frame has been compressed and stored. If all information in the current frame has not yet been compressed, the method 100 continues with step S103 to compress the next pixel in the frame. If the end of the data stream has been reached, the method 100 terminates in step S110.

If all information in the current frame has been compressed, processing continues in a manner that depends on what follows the current frame in the sequence of frames. If the digital video information is organized into frames that convey data generated by predictive or differential coding methods, these frames cannot be decoded without access to some "intraframe" having values that formed the basis of the predictive or differential coding. An intraframe conveys data that can be decoded without access to any other frame. The method 100 may be used to compress digital video data that was encoded using coding techniques that provide intraframes. If the next frame in the sequence is an intraframe, then the method 100 continues with step S102 to build a new radix tree and compress data in subsequent frames using the new tree. If the next frame is not an intraframe, the first pixel in the next frame is compressed by continuing with step S103.

Radix Tree

The inventor has determined that very few unique combinations of chrominance values generally occur in video images. Objects in the images tend to have a substantially uniform color within their borders; therefore, the chrominance values Cb, Cr tend to be correlated. The present invention exploits this characteristic by constructing a palette of colors and an associated tree structure. Nodes in the tree are assigned compact identifiers that establish an association between the nodes and the colors stored in the palette. The tree is built during a single pass through the digital video data stream.

A "radix tree" is used to store information for the palette. A radix tree has a root node and one or more other nodes. Each node except the root node has a link to only one parent node. Each node including the root node may have links to as many as two child nodes having the binary values zero and one. The two child nodes for a respective parent node must have different values. A "leaf node" is a node that has no child nodes. Each respective node in the tree is associated with a unique lookup key equal to the values of the nodes that are encountered during a traverse of the links from the root node to the respective node. Referring to the tree 200 shown in FIG. 4A, for example, a traversal of the tree from the root node 220 to the node 222 encounters only the node 222 itself. This node has a value of one; therefore, "1" is the lookup key for the node 222. Traversal of the tree from the root node 220 to the node 224 encounters the node 222 having the value one followed by the node 224 having the value zero; therefore, "10" is the lookup key for the node 224. Continuing the traversal of the tree, it may be seen that "101" and "1010" are the lookup keys for the node 226 and 228, respectively.

Figure 4A:
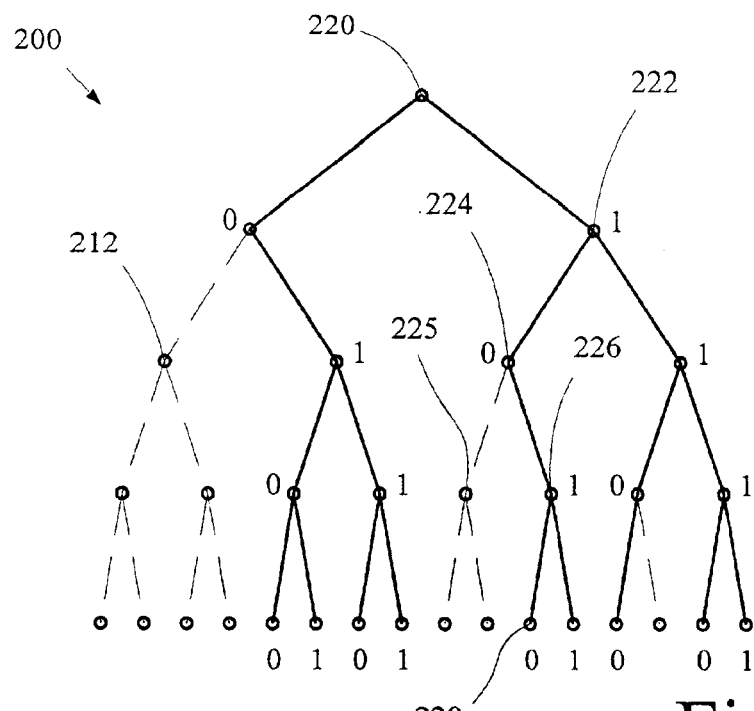
FIGS. 4A and 4B are graphical representations of a radix tree.

Referring to the tree shown in FIG. 4A, a search for a node having the lookup key "100" is an attempt to find the node 225. The first symbol "1" in the key "100" directs a traversal of the tree from the root node 220 to the node 222. The second symbol "0" of the key directs a traversal of the tree from the node 222 to the node 224. The third symbol "0" in the key directs the search to attempt traversing from the node 224 to the node 225; however, the node 225 is not stored in the tree. The broken line between the node 224 and the missing node 225 indicates there is no link to traverse. A search for key "100" in the tree shown in FIG. 4A returns an indication that the node was not found.

Figure 4B:
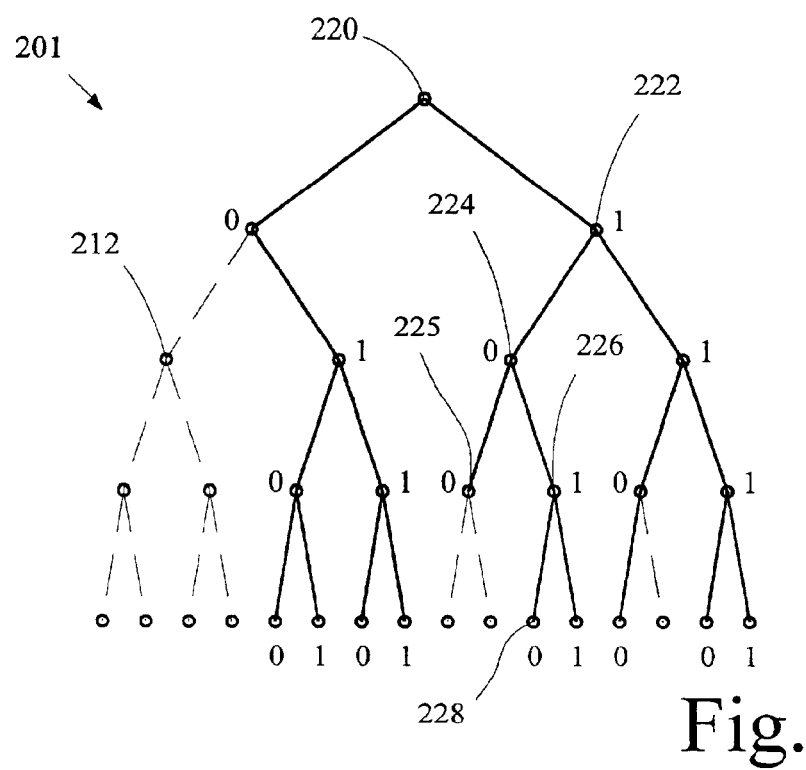

If a node is not found when the radix tree is being built, step S110 in the method 100 creates a new node in the tree by creating all missing links. In the example discussed above, the node 225 would be created in response to an attempt to find key "100" when the variable Mode indicates the tree is being built. The creation of this node is reflected in the tree 201 shown in FIG. 4B. A compact identifier for each node is stored in the tree when the node is created. In one implementation where the tree is limited to specified number of nodes, the identifier is a fixed-length binary number equal to the count of nodes in the tree. Referring to the examples shown in the figures, twenty nodes are present in the tree 200 shown in FIG. 4A. When the node 225 is added to the tree, it becomes the twenty-first node. In this implementation, it is assigned a binary identifier 10101, which is equal to decimal 21. The identifier associated with a node is not the same as the node's lookup key. The identifier is used as the code value X discussed above.

In one particular implementation that compresses digital video information for pictures having 176-by-144 pixels (QCIF format) or pictures having 352-by-288 pixels (CIF format), the luminance value Y and the chrominance values Cb, Cr in the input digital video data stream are all eight bits in length. The luminance value Y is rounded and truncated in step S104 to a length of six bits. The chrominance values are encoded using a radix tree that can store as many as 256 nodes. The identifier for each node is an eight-bit number.

Palette

A palette is constructed for the first 256 pairs of Cb, Cr values that are encountered in the sequence of frames of digital video information. The lookup key for each pair of values is obtained from the first eight bits of an interleaved representation of the two values. The first bit of the lookup key K is equal to the most significant bit (MSB) of the Cb value. The second bit of the lookup key K is equal to the MSB of the Cr value. The third bit of K is the second MSB of the Cb value and the fourth bit of K is the second MSB of the Cr value. In other words, the eight-bit lookup key is formed from the four MSB of Cb interleaved with the four MSB of Cr.

Each entry in the palette stores sixteen bits for one pair of chrominance values Cb, Cr. The palette may be stored in a separate array with entries arranged according to the order in which they were stored in the array, or it may be stored in a data structure that defines the radix tree links and node identifiers. The values stored in the palette are not the same as the associated lookup key. The eight-bit lookup key contains only the first four bits of each chrominance value. A sixteen-bit palette entry contains all eight bits for each chrominance value in the pair of values Cb, Cr. This assures that each entry in the palette represents a color that occurs at least once in the digital video data stream.

Step S110 creates new nodes in the radix tree until the palette is filled. If the capacity of the palette is 256 colors, for example, step S110 changes the variable Mode to indicate the construction of the radix tree is complete when the palette color count, or equivalently, the tree node count reaches 256. Subsequently, when step S106 determines a lookup key K is not found in the tree, step S109 provides an approximate value for the Cb, Cr values by obtaining the closest match from the palette.

Approximation

An approximate color is provided by traversing the radix tree through as many nodes as possible along the path indicated by the lookup key K. Thereafter, the tree is traversed as if the remaining bits in the lookup key K are the same as the first bit that represents a missing link in the tree.

For example, suppose a pair of chrominance values Cb, Cr obtained in step S103 provide a lookup key K="1001" for the tree 200 shown in FIG. 4A. If the variable Mode indicates tree construction has completed, step S109 provides an approximate value for chrominance by traversing the tree 200 to the node 224, where the third symbol "0" in the lookup key refers to a missing link because the node 225 is not stored in the tree. Thereafter, the tree 200 is traversed as if the remaining symbols in the look up key K are "0". This causes the traversal to reach the node 228. The color stored in the entry of the palette associated with the node 228 represents the closest match stored in the palette to the color represented by the Cb, Cr values.

Alternative Implementation

The lookup key may be formed in many ways. It may be obtained from a concatenation of two chrominance values, or from essentially any other combination of the chrominance values that may be desired. In one implementation, a radix tree is built using values that ignore a few least significant bits of the lookup key K. This further reduces the amount of memory required to store video information by reducing the number of nodes needed in the tree and it also tends to spread the colors in the palette more evenly over the portion of color space present in the digital video information.

The use of a radix tree is convenient but not essential. Other types of data structures may be used including arrays or tables of entries that can be searched and updated. No particular structure is essential in principle.

Data Expansion

Figure 5:
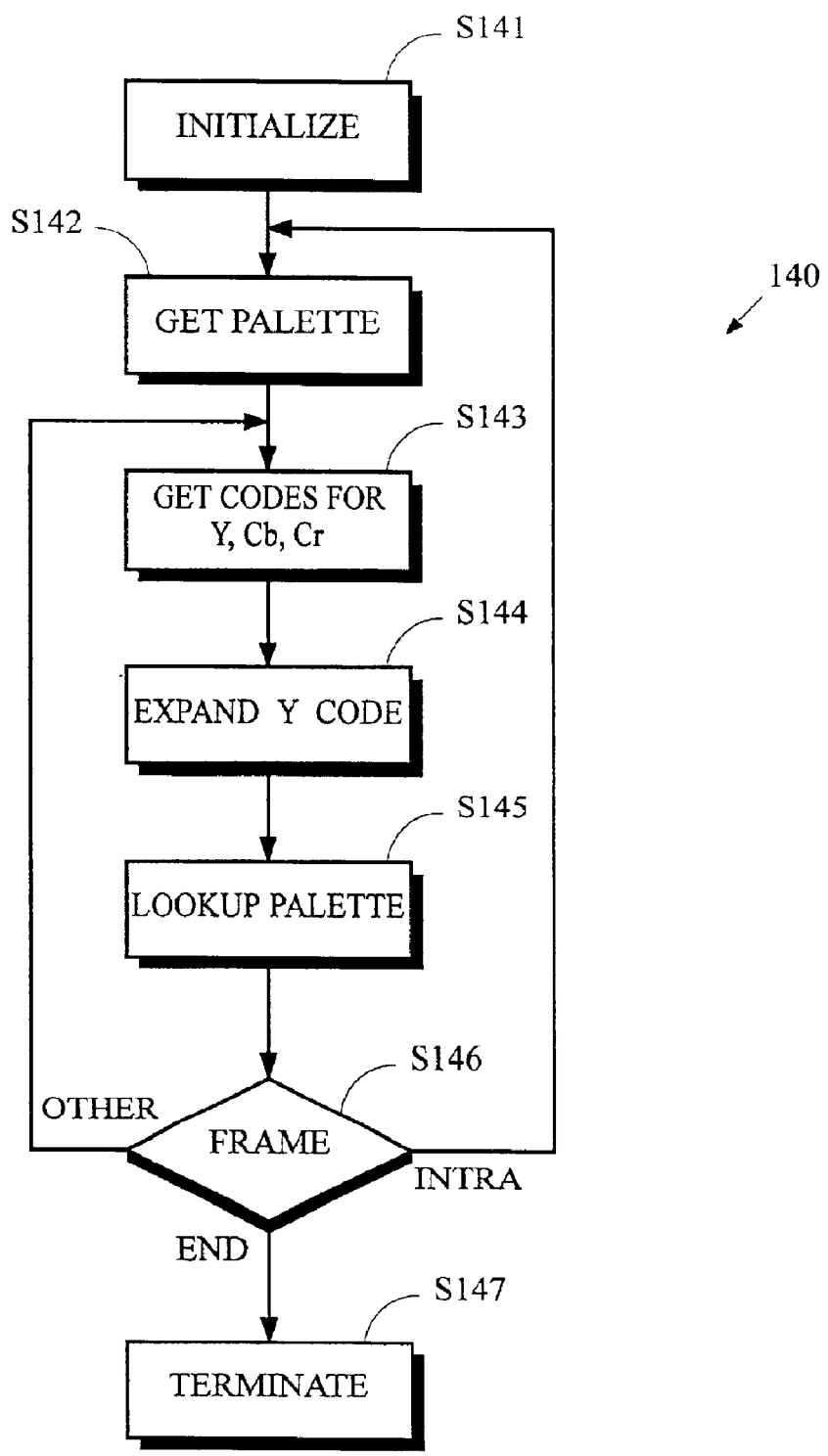
FIG. 5 is a flow diagram illustrating steps in a method that may be used to recover digital video information from compressed representations.

FIG. 5 illustrates steps in a method 140 that decompresses encoded information for pixels from a sequence of frames of digital video information in a data stream. Step S141 initializes program and hardware components. Information representing a palette of colors is obtained in step S142.

Step S143 retrieves information from the RAM 15 to obtain codes representing the luminance value and the chrominance values for a pixel. Step S144 pads the code for the luminance value Y with zero bits to expand it to its appropriate length. Step S145 uses the code for the chrominance values to identify an entry in the palette, and obtains the chrominance values Cb, Cr stored in that entry of the palette.

Step S146 determines whether all digital video information for the current frame has been decompressed. If all information in the current frame has not yet been decompressed, the method 140 continues with step S143 to decompress the next pixel in the frame. If the end of the data stream has been reached, the method 140 terminates in step S147.

If all information in the current frame has been decompressed, processing continues in a manner that depends on what follows the current frame. If next frame is an intraframe, then the method 140 continues with step S142 to obtain a new palette and decompress data in subsequent frames using the new palette. If the next frame is not an intra-frame, the first pixel in the next frame is decompressed by continuing with step S143.

What is claimed is:

1. A method for compressing digital video data representing luminance values, first chrominance values and second chrominance values for a plurality of pixels, wherein for a respective pixel the method comprises:

storing in memory a compressed representation of the luminance value for the respective pixel;

generating a lookup key in response to the first chrominance value and the second chrominance value for the respective pixel;

determining whether an entry in a data structure has a key that matches the lookup key, wherein the data structure comprises a plurality of entries each having a respective key, a respective identifier, and a respective pair of first and second chrominance values;

when an entry in the data structure has a key that matches the lookup key, storing in memory the identifier of the entry in the data structure having the key that matches the lookup key; and when no entry in the data structure has a key that matches the lookup key, either:

storing in memory the identifier of the entry in the data structure having a key that approximately matches the lookup key when the method is operating in an approximate mode of operation, or adding an entry to the data structure having a key that matches the lookup key, having a unique identifier, and having a pair of first and second chrominance values derived from the first chrominance value and the second chrominance value for the respective pixel, storing in memory the unique identifier of the entry added to the data structure, and setting the approximate mode of operation when no further entries are to be added to the data structure.

2. The method according to claim 1 that obtains the compressed representation of the luminance value by rounding and truncating the luminance value, wherein a luminance value equidistant from an even truncated value and an odd truncated value is rounded and truncated to the even truncated value.

3. The method according to claim 1, wherein each entry in the data structure corresponds to a node in a radix tree having a binary value equal to either zero or one, the key for a respective node is equal to a concatenation of the binary values for the nodes encountered while traversing the radix tree to reach the respective node, the identifier for the respective node is derived from an order in which nodes are added to the radix tree, and the pair of first and second chrominance values for the respective node are arranged in a palette according to the identifier of the respective node.

4. The method according to claim 1 that generates the lookup key by interleaving at least some bits of the first chrominance value and the second chrominance value for the respective pixel in order from most significant bits to least significant bits.

5. The method according to claim 4, wherein bits of the pair of first and second chrominance values for the entry added to the data structure match all bits of the first chrominance value and the second chrominance value, respectively, for the respective pixel.

6. The method according to claim 1, wherein each entry in the data structure is a node in a radix tree having a binary value equal to either zero or one and the key for a respective node is equal to a concatenation of the binary values for the nodes encountered while traversing the radix tree to reach the respective node, wherein the method determines which entry in the data structure has a key that approximately matches the lookup key by:

(a) traversing the radix tree along a path that encounters nodes having binary values that match corresponding bits in the lookup key until the radix tree does not include a node having a binary value that corresponds to a respective bit of the lookup key;

(b) traversing the radix tree along a path that encounters a node having a binary value that does not match the respective bit; and (c) continuing traversal of the radix tree by iterating steps (a) and (b) as if all remaining bits in the lookup key are equal to the respective bit until reaching a leaf node of the radix tree or until exhausting all bits of the lookup key, and identifying the last node encountered in the traversal as the entry in the data structure that has a key that approximately matches the lookup key.

7. The method according to claim 1, wherein the digital video data is arranged in a sequence of frames in which intraframes are separated from one another by a plurality of regular frames, each intraframe conveying encoded video data that can be decoded without access to data conveyed in any regular frame or any other intraframe, and each regular frame conveying encoded video data that cannot be decoded without access to a previous intraframe, and wherein the method comprises clearing the data structure of all entries and setting the mode of operation to be other than the approximate mode of operation in response to receiving an intraframe of video data.

8. A medium readable by a device and conveying a program of instructions executable by the device to perform a method for compressing digital video data representing luminance values, first chrominance values and second chrominance values for a plurality of pixels, wherein for a respective pixel the method comprises:

storing in memory a compressed representation of the luminance value for the respective pixel;

generating a lookup key in response to the first chrominance value and the second chrominance value for the respective pixel;

determining whether an entry in a data structure has a key that matches the lookup key, wherein the data structure comprises a plurality of entries each having a respective key, a respective identifier, and a respective pair of first and second chrominance values;

when an entry in the data structure has a key that matches the lookup key, storing in memory the identifier of the entry in the data structure having the key that matches the lookup key; and when no entry in the data structure has a key that matches the lookup key, either:

storing in memory the identifier of the entry in the data structure having a key that approximately matches the lookup key when the device is operating in an approximate mode of operation, or adding an entry to the data structure having a key that matches the lookup key, having a unique identifier, and having a pair of first and second chrominance values derived from the first chrominance value and the second chrominance value for the respective pixel, storing in memory the unique identifier of the entry added to the data structure, and setting the approximate mode of operation for the device when no further entries are to be added to the data structure.

9. The medium according to claim 8, wherein the method obtains the compressed representation of the luminance value by rounding and truncating the luminance value, wherein a luminance value equidistant from an even truncated value and an odd truncated value is rounded and truncated to the even truncated value.

10. The medium according to claim 8, wherein each entry in the data structure corresponds to a node in a radix tree having a binary value equal to either zero or one, the key for a respective node is equal to a concatenation of the binary values for the nodes encountered while traversing the radix tree to reach the respective node, the identifier for the respective node is derived from an order in which nodes are added to the radix tree, and the pair of first and second chrominance values for the respective node are arranged in a palette according to the identifier of the respective node.

11. The medium according to claim 8, wherein the method generates the lookup key by interleaving at least some bits of the first chrominance value and the second chrominance value for the respective pixel in order from most significant bits to least significant bits.

12. The medium according to claim 11, wherein bits of the pair of first and second chrominance values for the entry added to the data structure match all bits of the first chrominance value and the second chrominance value, respectively, for the respective pixel.

13. The medium according to claim 8, wherein each entry in the data structure is a node in a radix tree having a binary value equal to either zero or one and the key for a respective node is equal to a concatenation of the binary values for the nodes encountered while traversing the radix tree to reach the respective node, wherein the method determines which entry in the data structure has a key that approximately matches the lookup key by:

(a) traversing the radix tree along a path that encounters nodes having binary values that match corresponding bits in the lookup key until the radix tree does not include a node having a binary value that corresponds to a respective bit of the lookup key;

(b) traversing the radix tree along a path that encounters a node having a binary value that does not match the respective bit; and (c) continuing traversal of the radix tree by iterating steps (a) and (b) as if all remaining bits in the lookup key are equal to the respective bit until reaching a leaf node of the radix tree or until exhausting all bits of the lookup key, and identifying the last node encountered in the traversal as the entry in the data structure that has a key that approximately matches the lookup key.

14. The medium according to claim 8, wherein the digital video data is arranged in a sequence of frames in which intraframes are separated from one another by a plurality of regular frames, each intraframe conveying encoded video data that can be decoded without access to data conveyed in any regular frame or any other intraframe, and each regular frame conveying encoded video data that cannot be decoded without access to a previous intraframe, and wherein the method comprises clearing the data structure of all entries and setting the mode of operation to be other than the approximate mode of operation in response to receiving an intraframe of video data.

15. An apparatus for compressing digital video data representing luminance values, first chrominance values and second chrominance values for a plurality of pixels, wherein the apparatus comprises memory and processing circuitry coupled to the memory, wherein for a respective pixel the processing circuitry performs a process that comprises:
   storing in the memory a compressed representation of the luminance value for the respective pixel;
   generating a lookup key in response to the first chrominance value and the second chrominance value for the respective pixel;
   determining whether an entry in a data structure has a key that matches the lookup key, wherein the data structure comprises a plurality of entries each having a respective key, a respective identifier, and a respective pair of first and second chrominance values;
   when an entry in the data structure has a key that matches the lookup key, storing in the memory the identifier of the entry in the data structure having the key that matches the lookup key; and
   when no entry in the data structure has a key that matches the lookup key, either:
      storing in the memory the identifier of the entry in the data structure having a key that approximately matches the lookup key when the apparatus is operating in an approximate mode of operation, or
      adding an entry to the data structure having a key that matches the lookup key, having a unique identifier, and having a pair of first and second chrominance values derived from the first chrominance value and the second chrominance value for the respective pixel, storing in the memory the unique identifier of the entry added to the data structure, and setting the approximate mode of operation for the apparatus when no further entries are to be added to the data structure.

16. The apparatus according to claim 15 that obtains the compressed representation of the luminance value by rounding and truncating the luminance value, wherein a luminance value equidistant from an even truncated value and an odd truncated value is rounded and truncated to the even truncated value.

17. The apparatus according to claim 15, wherein each entry in the data structure corresponds to a node in a radix tree having a binary value equal to either zero or one, the key for a respective node is equal to a concatenation of the binary values for the nodes encountered while traversing the radix tree to reach the respective node, the identifier for the respective node is derived from an order in which nodes are added to the radix tree, and the pair of first and second chrominance values for the respective node are arranged in a palette according to the identifier of the respective node.

18. The apparatus according to claim 15 that generates the lookup key by interleaving at least some bits of the first chrominance value and the second chrominance value for the respective pixel in order from most significant bits to least significant bits.

19. The apparatus according to claim 18, wherein bits of the pair of first and second chrominance values for the entry added to the data structure match all bits of the first chrominance value and the second chrominance value, respectively, for the respective pixel.

20. The apparatus according to claim 15, wherein each entry in the data structure is a node in a radix tree having a binary value equal to either zero or one and the key for a respective node is equal to a concatenation of the binary values for the nodes encountered while traversing the radix tree to reach the respective node, wherein the process determines which entry in the data structure has a key that approximately matches the lookup key by:
   (a) traversing the radix tree along a path that encounters nodes having binary values that match corresponding bits in the lookup key until the radix tree does not include a node having a binary value that corresponds to a respective bit of the lookup key;
   (b) traversing the radix tree along a path that encounters a node having a binary value that does not match the respective bit; and
   (c) continuing traversal of the radix tree by iterating steps (a) and (b) as if all remaining bits in the lookup key are equal to the respective bit until reaching a leaf node of the radix tree or until exhausting all bits of the lookup key, and identifying the last node encountered in the traversal as the entry in the data structure that has a key that approximately matches the lookup key.

21. The apparatus according to claim 15, wherein the digital video data is arranged in a sequence of frames in which intraframes are separated from one another by a plurality of regular frames, each intraframe conveying encoded video data that can be decoded without access to data conveyed in any regular frame or any other intraframe, and each regular frame conveying encoded video data that cannot be decoded without access to a previous intraframe, and wherein the process comprises clearing the data structure of all entries and setting the mode of operation to be other than the approximate mode of operation in response to receiving an intraframe of video data.

22. An apparatus for compressing digital video data representing luminance values, first chrominance values and second chrominance values for a plurality of pixels, wherein for a respective pixel the apparatus comprises:
   means for storing in memory a compressed representation of the luminance value for the respective pixel;
   means for generating a lookup key in response to the first chrominance value and the second chrominance value for the respective pixel;
   means for determining whether an entry in a data structure has a key that matches the lookup key, wherein the data structure comprises a plurality of entries each having a respective key, a respective identifier, and a respective pair of first and second chrominance values; and
   means for, when an entry in the data structure has a key that matches the lookup key, storing in memory the identifier of the entry in the data structure having the key that matches the lookup key, and when no entry in the data structure has a key that matches the lookup key, for either:
      storing in memory the identifier of the entry in the data structure having a key that approximately matches the lookup key when the apparatus is operating in an approximate mode of operation, or
      adding an entry to the data structure having a key that matches the lookup key, having a unique identifier, and having a pair of first and second chrominance values derived from the first chrominance value and the second chrominance value for the respective pixel, storing in memory the unique identifier of the entry added to the data structure, and setting the approximate mode of operation for the apparatus when no further entries are to be added to the data structure.

23. The apparatus according to claim 22 that obtains the compressed representation of the luminance value by rounding and truncating the luminance value, wherein a luminance value equidistant from an even truncated value and an odd truncated value is rounded and truncated to the even truncated value.

24. The apparatus according to claim 22, wherein each entry in the data structure corresponds to a node in a radix tree having a binary value equal to either zero or one, the key for a respective node is equal to a concatenation of the binary values for the nodes encountered while traversing the radix tree to reach the respective node, the identifier for the respective node is derived from an order in which nodes are added to the radix tree, and the pair of first and second chrominance values for the respective node are arranged in a palette according to the identifier of the respective node.

25. The apparatus according to claim 22 that generates the lookup key by interleaving at least some bits of the first chrominance value and the second chrominance value for the respective pixel in order from most significant bits to least significant bits.

26. The apparatus according to claim 25, wherein bits of the pair of first and second chrominance values for the entry added to the data structure match all bits of the first chrominance value and the second chrominance value, respectively, for the respective pixel.

27. The apparatus according to claim 22, wherein each entry in the data structure is a node in a radix tree having a binary value equal to either zero or one and the key for a respective node is equal to a concatenation of the binary values for the nodes encountered while traversing the radix tree to reach the respective node, wherein the apparatus determines which entry in the data structure has a key that approximately matches the lookup key by:

(a) traversing the radix tree along a path that encounters nodes having binary values that match corresponding bits in the lookup key until the radix tree does not include a node having a binary value that corresponds to a respective bit of the lookup key;

(b) traversing the radix tree along a path that encounters a node having a binary value that does not match the respective bit; and (c) continuing traversal of the radix tree by iterating steps (a) and (b) as if all remaining bits in the lookup key are equal to the respective bit until reaching a leaf node of the radix tree or until exhausting all bits of the lookup key, and identifying the last node encountered in the traversal as the entry in the data structure that has a key that approximately matches the lookup key.

28. The apparatus according to claim 22, wherein the digital video data is arranged in a sequence of frames in which intraframes are separated from one another by a plurality of regular frames, each intraframe conveying encoded video data that can be decoded without access to data conveyed in any regular frame or any other intraframe, and each regular frame conveying encoded video data that cannot be decoded without access to a previous intraframe, and wherein the apparatus comprises means for clearing the data structure of all entries and setting the mode of operation to be other than the approximate mode of operation in response to receiving an intraframe of video data.

* * * * *